(12) United States Patent
Staggs

(10) Patent No.: US 6,588,144 B1
(45) Date of Patent: Jul. 8, 2003

(54) SELF LOCKING TREE AND PLANT GUARD

(76) Inventor: Laurie Staggs, 4326 10th Ct. SE., Salem, OR (US) 97302

( * ) Notice: Subject to any disclaimer, the term of this patent is extended or adjusted under 35 U.S.C. 154(b) by 0 days.

(21) Appl. No.: 09/894,687

(22) Filed: Jun. 28, 2001

(51) Int. Cl.[7] .............................................. A01G 13/10
(52) U.S. Cl. ......................................................... 47/30
(58) Field of Search ................................. 47/32.4, 32.5, 47/32.6, 29.7, 30, 31.1

(56) References Cited

U.S. PATENT DOCUMENTS

| | | | |
|---|---|---|---|
| 110,091 A | 12/1870 | Trumbell | |
| 219,987 A | 9/1879 | Scott | |
| 283,837 A | 8/1883 | Wallace | |
| 642,064 A | 1/1900 | Bailey | |
| 1,548,682 A | 8/1925 | Gulin | |
| 2,140,932 A | * 12/1938 | Avery | 162/143 |
| 2,999,479 A | 9/1961 | Carder | |
| 3,208,478 A | 9/1965 | Baines | |
| 3,570,746 A | * 3/1971 | Wood | 206/140 |
| 3,701,181 A | * 10/1972 | Lock | 206/434 |
| 3,765,594 A | * 10/1973 | Cramphorn | 229/106 |
| 3,869,079 A | * 3/1975 | Oglesbee | 206/139 |
| 3,963,170 A | * 6/1976 | Wood | 206/434 |
| 4,679,725 A | * 7/1987 | Wilson | 206/427 |
| 4,846,394 A | * 7/1989 | Swanson | 229/162 |
| 5,222,325 A | 6/1993 | Angus | |
| 5,471,783 A | 12/1995 | McLean | |
| 5,878,948 A | * 3/1999 | Schultz et al. | 229/117.14 |

FOREIGN PATENT DOCUMENTS

| | | |
|---|---|---|
| DE | 37 15 632 A1 | 10/1987 |
| FR | 2676209 A1 * | 11/1992 |
| FR | 2753341 * | 9/1996 |
| GB | 2224421 A * | 5/1990 |

* cited by examiner

Primary Examiner—Peter M. Poon
Assistant Examiner—Jeffrey L. Gellner
(74) Attorney, Agent, or Firm—Bidwell, Janke & Durando, PLC

(57) ABSTRACT

A tree guard for young trees, seedlings, saplings and other plants which is a flat sheet having locking wing shaped tabs provided which are formed from and integral with the sheet, and receiving cut outs in the sheet positioned so as to securely receive and hold the wing shaped locking tabs such that when the sheet is rolled into a cylindrical shape the side ends of the sheet are securely connected to each other.

20 Claims, 1 Drawing Sheet

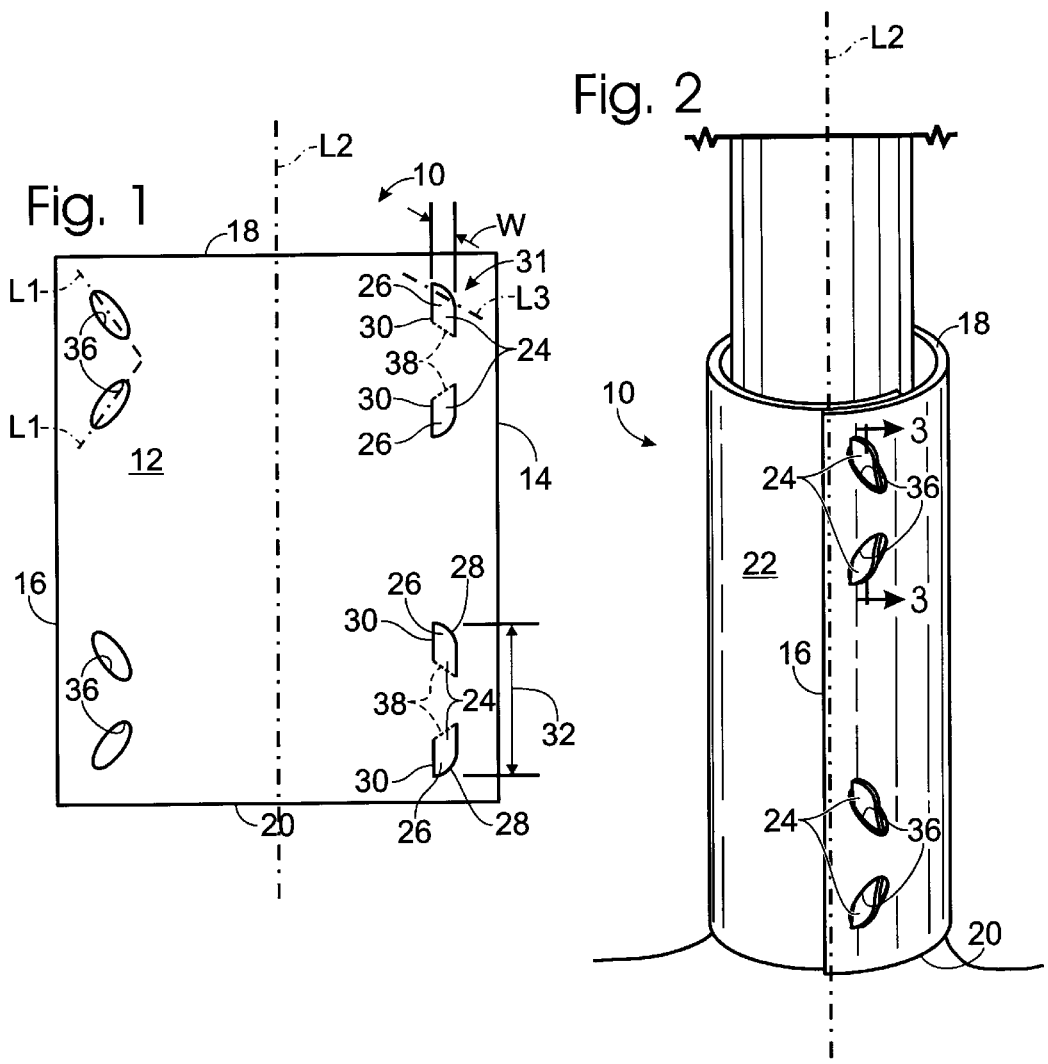
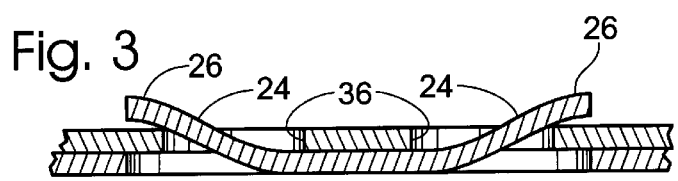

SELF LOCKING TREE AND PLANT GUARD

BACKGROUND OF THE INVENTION

1. Field of Invention

This invention relates to a guard for trees and plants, including seedlings, saplings and vines, and more particularly to a self-locking tree and plant guard.

2. Description of Prior Art

Trees and plants, particularly when young, are subject to a variety of hazards to their trunks and stems. These include environmental hazards such as gnawing by rodents and deer, insect damage and ultraviolet sun damage.

A variety of tree and plant guards for this purpose are known. One type of guard is a sheet of flexible material which when wrapped and connected around a trunk or stem, a cylindrical guard is formed. A problem area is the manner in which the ends of the sheet are connected. Some guards are simply secured with tape, a non-permanent and time-consuming method. Others use clasps. The use of clasps as a means for connection increases the cost of manufacture due to the need for attachment of the clasps to the sheet. Other guards utilize projecting integral tabs provided on one end of the sheet and receiving slits or cut outs for the tabs on the opposing end of the sheets. This use of an outwardly projecting tab also increases the cost of manufacture due to the waste created by utilization of an outwardly projecting tab, rather than a tab formed from within the sheet. Finally, the guard that does utilize a tab and receiving cut but system where the tab is formed from within the sheet, utilizes a tab that is not conducive to one-handed connection by a user, thereby increasing the time spent attaching the guards. As such, there is a need for a simple and economical guard that can be attached and connected around a tree or stem with one hand.

For example, U.S. Pat. No. 110,091 to Trunmbell discloses a tree protector coniprising a rectangular shape of material with cut in sections on its inner edge so as to create a box when wrapped around a tree. Once wrapped around the tree, this protector is connected via clasps. U.S. Pat. No. 219,987 to Scott discloses a tree protector comprising material in a conical shape plus a band that once wrapped around a tree is connected via a double clasp construction, much like a paper clip. U.S. Pat. No. 283,387 to Wallace discloses a guard for plants and trees comprising a material saturated with insect deterrent that is connected via projecting tongues on one edge that fit into slits on the opposing edge. This guard has tongues projecting outwardly from the material. Similarly, U.S. Pat. No. 642,064 to Bainey, U.S. Pat. No. 5,222,325 to Angus, and U.S. Pat. No. 5,471,783 to McLean patents disclose tree guards that include tongues or tabs that project outwardly from the material and into opposing slits or slots as a means of connecting the opposing edges of the guard.

In addition, while U.S. Pat. No. 1,548,628 to Gulin discloses a tree protector that is generally rectangular with a curved top edge that is connected via tongues and slits wherein the tongues are an integral part of the material, the two sets of tongues and slits, one horizontal and one vertical, are difficult to maneuver. It requires two hands and the tabs need to fit into slits.

The current device embodying the invention circumvents these issues by utilizing tabs and receiving cut outs, such as a slit or cut out, that are formed out of and integral with the sheet, and by utilizing a shape and position of the tab or tabs so as to allow a one handed operation by the user.

OBJECTS AND ADVANTAGES

Accordingly, several objects of the invention are:

1. to provide for economical manufacture and reduction of waste in the manufacture due to a limitation in the number of parts;
2. to provide for simple and quick attachment and connection of a guard around a tree or stem;
3. to provide for a guard that can be attached with the use of only one hand; and
4. to provide for a guard that is not easily detachable.

BRIEF SUMMARY OF THE INVENTION

The tree guard in its flattened state comprises a flat sheet having a top edge, a bottom edge, and two side ends, which when rolled forms a cylindrical shape. Locking tabs in a wing shape are provided on one end of the sheet, which are formed form and integral with the sheet, one tab adjacent the top edge and one tab adjacent the bottom edge. Preferably each wing has a curved side portion adjacent the end and a straight opposing side portion, the straight portion creating a secure locking edge. A pair of receiving cut outs are provided on the other end of the sheet, and are positioned so as to securely receive and hold the wing shaped locking tabs when the sheet is rolled into the cylindrical shape and the side ends connected to each other. Preferably each cut out is an angularly positioned oval shape, one for each wing of each wing-shaped tab and is angled approximately 45 degrees from vertical toward its side edge of the shape. The cut outs may also include slits or other shapes, so long as the wing shaped tabs are able to be secured.

One benefit of the wing-shape of the tabs is the ease of connecting the side ends, because of the ability to use one hand to push the tabs into the cut outs or other opening of the opposing end to form the cylindrical shape.

BRIEF DESCRIPTION OF THE SEVERAL VIEWS OF THE DRAWINGS

FIG. 1 shows a flattened form of the preferred embodiment of the tree device.

FIG. 2 is a perspective view of the device shown in FIG. 1 in use in cylindrical form around a tree trunk.

FIG. 3 is an enlarged sectional view taken along line 3—3 in FIG. 2 showing the locking of a tab in a receiving cut out.

DETAILED DESCRIPTION OF THE INVENTION

FIGS. 1–2 show the tree guard 10 in the preferred embodiment. The tree guard 10 in its flattened state comprises a flat sheet 12 having side ends, first and second 14 and 16, a top edge 18 and a bottom edge 20, which in use is rolled into a cylindrical shape 22 as shown in FIG. 2. The preferred flat sheet 12 material is single faced corrugated plastic, but may be constructed from plastics material, cardboard, or other flexible material.

A pair of locking tabs 24 is provided on the first side end 14, one tab of the pair 24 adjacent the top edge 18 and one tab adjacent the bottom edge 20. The number of tabs may be different depending on the size of the tree guard 10. The tabs 24 are formed from and integral with the flat sheet 12. Each tab 24 is a formed in a wing shape, and preferably each wing 26 has a curved side portion 28 adjacent the first side end 14 and a straight opposing side portion 30, the straight opposing side portion 30 creating a secure locking edge. Any wing shaped tab will suffice, so long as the wings are of a dimension so as to allows the thumb and a finger of the user to push down on the wing portions with one hand when securing. The preferred dimension for each tab 24 shown as dimension 32 is approximately 6 inches.

A pair of receiving Cut outs 36 are provided on the second side end 16, and are positioned so as to securely receive and hold the pair of locking tabs 24 when the flat sheet 12 is rolled into the cylindrical shape 22 and the side ends 14 and 16 are connected to each other. Preferably each cut out 36 is an angularly positioned oval shape, one for each side of the wings 26 and is angled approximately 45 degrees from vertical toward its side edge. The cut outs 36 may also include slits or other shapes, so long as the pair of locking tabs 24 are able to be secured. Another optional feature is a scored cut 38 for each of bending the wing-shaped tabs. 24

Some details of the preferred plant and tree guard shown in the Figures are particularly pointed out. The tabs 26 are attached to the sheet 12 at a hinge 38 defining a hinge line shown dashed in FIG. 1. The preferred tab 26 is no wider, along any line parallel to the hinge line 38, than the hinge line itself as shown; however, this is not essential to the invention. Also as shown in FIG. 1, the straight side portion 30 forms one side edge of the tab, while an opposite side portion 31 that is proximate the first side end 14 of the sheet 12 has a least a portion thereof which is convexly curved.

Preferably, the tabs are provided with a maximum width "w" that maximizes the length of the hinges 38. For example, along any line parallel to the hinge line 38, e.g., the line "L3" in FIG. 1, the width "w" of the tab is substantially no greater than the length of the hinge line.

The cut outs 36 for the tabs 26 are preferably elongate slots having respective elongate axes "L1" which are preferably substantially parallel to the corresponding hinge lines. As shown in FIG. 2, if the tabs 26 are inserted into their associated cut outs 36, the sheet 12 adopts a cylindrical configuration defining a cylindrical axis "L2".

The tabs and associated slots are preferably provided as sets of oppositions as shown in FIG. 1. For one of the tabs of such a set, the hinge line is oriented so that it is inclined from, i.e., angled with respect to, the direction of the cylindrical axis "L2," such as illustrated, and for the other of the tabs of the opposed pair, the hinge line is preferably opposingly inclined. For purposes herein, a line may be "inclined" either positively or negatively. Preferably, the angle of inclination is about +/-45 degrees such as illustrated. The hinge lines 38 are preferably proximate one another as shown so that the tabs extend in opposing directions as well.

To lock, as shown in FIG. 3, the user places the thumb and a finger on a tab 24 after bringing the side ends 14 and 16 together so that the cut outs 36 are able to receive the tabs 24. The user then presses down on at with both thumb and finger so as to plush each wing 26 of each tab 24 into its receiving cut out 36. Also, shown in FIG. 3 are two methods of locking. The wing-shaped tabs may be pushed inwardly or outwardly through the receiving cut outs, though if pushed inwardly toward the trunk, a single handed operation is possible.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A guard, comprising a sheet of material having first and second opposing sheet side edges, said sheet including at least a first tab and an associated elongate slot having an elongate axis, said first tab proximate said first sheet side edge and said slot proximate said second sheet side edge, wherein said first tab has first and second tab side edges, said first tab side edge joining said second tab side edge at a distal end of said first tab and being otherwise spaced apart, wherein a hinge line extends between said tab side edges at a proximal end of said first tab along which said first tab is hinged to said sheet of material, such that when said first tab is inserted in said associated slot, and said sheet of material adopts a cylindrical shape defining a cylindrical axis, said elongate axis of said slot is inclined substantially from the direction of said cylindrical axis.

2. The guard of claim 1, wherein said elongate axis of said slot is inclined substantially about 45 degrees from said direction of said cylindrical axis.

3. The guard of claim 1, wherein said material is corrugated plastic with the axis of corrugation substantially parallel to said cylindrical axis.

4. The guard of claim 1, wherein said guard is configured into said cylindrical shape.

5. A guard, comprising a sheet of material having first and second opposing sheet side edges, said sheet including at least a first tab and an associated slot, said first tab proximate said first sheet side edge and said slot proximate said second sheet side edge, wherein said first tab has first and second tab side edges, said first tab side edge joining said second tab side edge at a distal end of said first tab and being otherwise spaced apart, wherein a hinge line extends between said tab side edges at a proximal end of said first tab along which said first tab is hinged to said sheet of material, such that when said first tab is inserted in said associated slot, and said sheet of material adopts a cylindrical shape defining a cylindrical axis, said hinge line is inclined substantially from the direction of said cylindrical axis.

6. The guard of claims 5, wherein said hinge line is inclined substantially about 45 degrees from said direction of said cylindrical axis.

7. The guard of claim 5, wherein said slot is elongate and has an elongate axis, and wherein said elongate axis is substantially parallel to said hinge line.

8. The guard of claim 5, wherein said sheet includes a second tab and associated slot, said second tab proximate said first sheet side edge and said slot associated with said second tab proximate said second sheet side edge, wherein said second tab has first and second tab side edges, said first tab side edge of said second tab joining said second tab side edge of said second tab at a distal end of said second tab and being otherwise spaced apart, wherein a hinge line of said second tab extends between said tab side edges of said second tab at a proximal end of said second tab along which said second tab is hinged to said sheet of material, and wherein said hinge line of said second tab is proximate said hinge line of said first tab and opposingly inclined with respect thereto from the direction of said cylindrical axis.

9. The guard of claim 8, wherein said hinge lines are opposingly inclined substantially about 45 degrees from said direction of said cylindrical axis.

10. The guard of claims 9, wherein said slot associated with said first tab is elongate and has an elongate axis and said slot associated with said second tab is elongate and has an elongate axis, and wherein the elongate axes of said first and second tabs are parallel to said first and second hinge lines, respectively.

11. The guard of claim 8, wherein, along any line parallel to said hinge line of said first tab, the width of said first tab is substantially less than or equal to the length of said hinge line of said first tab.

12. The guard of claim 11, wherein at least a portion of said first tab side edge of said first tab is convex, and said second tab side edge of said first tab is substantially linear, and wherein said first tab side edge of said first tab is proximate said first sheet side edge with respect to said second tab side edge of said first tab.

13. The guard of claim 12, wherein, along any line parallel to said hinge line of said second tab, the width of said second tab is substantially less than or equal to the length of said hinge line of said second tab.

14. The guard of claim 13, wherein at least a portion of said first tab side edge of said second tab is convex, and said second tab side edge of said second tab is substantially linear, wherein said first tab side edge of said second tab is proximate said first sheet side edge with respect to said second tab side edge of said second tab.

15. The guard of claim 14, wherein said slot associated with said first tab is elongate and has an elongate axis and said slot associated with said second tab is elongate and has an elongate axis, and wherein the elongate axes of said first and second tabs are parallel to said first and second hinge lines, respectively.

16. The guard of claim 15, wherein said hinge lines are opposingly inclined substantially about 45 degrees from said direction of said cylindrical axis.

17. The guard of claim 5, wherein said material is corrugated plastic with the axis of corrugation substantially parallel to said cylindrical axis.

18. The guard of claim 5, wherein said guard is configured into said cylindrical shape.

19. A method for guarding an object, comprising the steps of:

providing a sheet of material having first and second opposing sheet side edges, said sheet including at least a first tab and an associated elongate slot having an elongate axis, said first tab proximate said first sheet side edge and said slot proximate said second sheet side edge, wherein said first tab has first and second tab side edges, said first tab side edge joining said second tab side edge at a distal end of said first tab and being otherwise spaced apart, wherein a hinge line extends between said tab side edges at a proximal end of said first tab along which said first tab is hinged to said sheet of material, such that when said first tab is inserted in said associated slot, and said sheet of material adopts a cylindrical shape defining a cylindrical axis, said elongate axis of said slot is inclined substantially from the direction of said cylindrical axis;

placing said sheet of material proximate the object; and inserting said tab into said slot, thereby causing said sheet of material to adopt a cylindrical shape around the object.

20. The method of claim 19, wherein the object is at least a portion of a plant.

* * * * *

UNITED STATES PATENT AND TRADEMARK OFFICE
CERTIFICATE OF CORRECTION

PATENT NO.    : 6,588,144 B1
DATED         : July 8, 2003
INVENTOR(S)   : Laurie Staggs It is certified that error appears in the above-identified patent and that said Letters Patent is hereby corrected as shown below:

<u>Column 4,</u>
Line 40, delete "claim 5" replace with -- claim 6 --

Signed and Sealed this

Eighteenth Day of November, 2003

JAMES E. ROGAN
*Director of the United States Patent and Trademark Office*